United States Patent [19]

Hongo et al.

[11] 4,331,773

[45] May 25, 1982

[54] REFRACTORY COMPOSITION

[75] Inventors: Yasuo Hongo; Yoshinori Tuzuki; Masao Miyawaki, all of Tamano, Japan

[73] Assignee: Nihon Tokushurozai Kabushiki Kaisha, Tamano, Japan

[21] Appl. No.: 233,552

[22] Filed: Feb. 11, 1981

Related U.S. Application Data

[63] Continuation of Ser. No. 106,009, Dec. 21, 1980, abandoned, which is a continuation of Ser. No. 920,267, Jun. 20, 1978, abandoned.

[51] Int. Cl.$^3$ .............................................. C04B 35/02
[52] U.S. Cl. ................................................... 501/128
[58] Field of Search ................................. 106/65, 73.4

[56]  References Cited

U.S. PATENT DOCUMENTS 3,953,563  4/1976  Kihlstedt et al. ..................... 106/65
4,119,474 10/1978  Whitman et al. ..................... 106/65

*Primary Examiner*—James Poer
*Attorney, Agent, or Firm*—James E. Nilles

[57]  ABSTRACT

A refractory composition comprising $\rho$-alumina as a binder. The refractory composition further includes as a binding assistant at least one selected from the group consisting of a dispersant, fumed silica and glass powder.

2 Claims, No Drawings

REFRACTORY COMPOSITION

This is a continuation of application Ser. No. 106,009, filed Dec. 21, 1980, which in turn is a continuation of application Ser. No. 920,267, filed June 20, 1978, both now abandoned.

The present invention relates to an prepared unshaped refractory (castable refractory) which is used mainly for casting and also applicable to gun working, pumping working, trowel working, ramming working and vibrating working, and which can also be used for formation of precast products and unburned bricks.

Castable refractories heretofore used are refractory concretes formed by incorporating an alumina cement into a refractory aggregate. However, these castable refractories have defects owing to the alumina cement used as a binder, especially CaO contained in the alumina cement. These defects involved in the use of the alumina cement are as follows:

(a) A castable refractory customarily used is formed by incorporating an alumina cement in a silicaalumina aggregate. This refractory can be regarded as a composition of the $SiO_2$-$Al_2O_3$-CaO system. As will be apparent from the equilibrium diagram, the aggregate reacts with the alumina cement during application, and as a result of this reaction, compounds having a low eutectic point are formed and the heat resistance of the aggregate is reduced.

(b) Structural spalling is caused. Namely, gehlenite and anorthite are formed by reaction of the alumina cement with $SiO_2$ and $Al_2O_3$ in the aggregate to form a metamorphic layer. It is said that this structurl spalling is due to formation of such metamorphic layer.

(c) The resistance to $Cl_2$ gas is low. $Fe_2O_3$, CaO, $SiO_2$ and $Al_2O_3$ are influenced by $Cl_2$ gas in this order. CaO in the alumina cement reacts with $Cl_2$ gas to form $CaCl_2$ having a low melting point, and the composition is thus damaged.

(d) The strength of an alumina cement-containing castable refractory is manifested as a result of hydration of the alumina cement. However, the strength is reduced because the hydrate is dehydrated and decomposed under heating, though this defect is not due to CaO.

When the amount used of the alumina cement is reduced so ss to eliminate or moderate these defects, the strength should naturally be lowered. Barium aluminate and strontium aluminate cements have been proposed as the substitute for the alumina cement, but they have not been practically used. A phosphate castable refractory can be mentioned as an alumina cement-free castable composition that is practically used. This composition ordinarily comprises aluminum primary phosphate as a binder and MgO powder as a hardening accelerator. This composition, however, still involves various defects. For example, low-melting-point compounds are formed in the $P_2O_5$-MgO system performing the binding action, and since aluminum primary phosphate is water-soluble, it migrates to the surface of the cast product, causing unevenness of the strength. Further, by evaporation of $P_2O_5$ in a high-temperature reducing atmosphere, such defects as degradation of the strength and uneven strength are caused. Accordingly, a castable refractory composition of this type is not suitable for formation of a refractory structure.

The present invention is to eliminate the foregoing defects involved in an alumina cement-containing refractory composition. More specifically, the present invention provides a refractory composition comprising $\rho$-alumina as a binder. $\rho$-Alumina has such characteristic properties that when water is added to $\rho$-alumina, it is hardened at room temperature and the so formed hydrate is converted under heating to stable $\alpha$-alumina. These characteristic properties are effectively utilized in the present invention. A binding assistant is further incorporated into the refractory composition of the present invention so as to enhance the binding effect of $\rho$-alumina.

The structure and effect of the present invention will now be described in detail.

(1) $\rho$-Alumina $\rho$-Alumina is an intermediate alumina formed by dehydrating gibbsite ($\alpha$-$Al_2O_3 \cdot 3H_2O$) or bayerite ($\beta$-$Al_2O_3 \cdot 3H_2O$) at a low temperature in vacuo. Seven intermediate alumina, i.e., $\rho$-, $\chi$-, $\eta$-, $\nu$-, $\delta$-, $\theta$- and $\kappa$-aluminas, have heretofore been confirmed. Among them, only $\kappa$- and $\theta$-aluminas show relatively sharp diffraction peaks in X-ray diffraction patterns, and the remaining aluminas show only broad diffraction peaks. $\rho$-Alumina is characterized in that one broad diffraction peak appears at the position of the spacing d = 1.40 A. Among intermediate aluminas, only $\rho$-alumina has a hydrating property and it shows a hardening phenomenon at the hydration.

$\rho$-Alumina is hardened according to the following reaction:

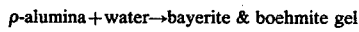

$\rho$-alumina + water → bayerite & boehmite gel

As a commercially available $\rho$-alumina, there can be mentioned "KHP-2" manufactured and sold by Sumitomo Aluminum Seiren Kabushiki Kaisha, which is a mixture of $\rho$-alumina, dehydrated boehmite, $\nu$-alumina and $\chi$-alumina and contains about 60% by weight of $\rho$-alumina. The chemical composition of this commercially available $\rho$-alumina and those of alumina cements are shown in Table 1.

TABLE 1

| Components | $\rho$-Alumina (KHP-2) (% by weight) | Alumina Cement (% by weight) | |
|---|---|---|---|
| | | JIS, First Class | CA-25 |
| $Al_2O_3$ | 94.5 | 52–57 | 79 |
| $SiO_2$ | 0.02 | below 6 | 0.1 |
| $Fe_2O_3$ | 0.03 | — | — |
| $Na_2O$ | 0.2 | — | — |
| CaO | — | 35–40 | 18 |
| ignition loss | 5.2 | — | 1.5 |

CA-25 is a white alumina cement manufactured and sold by ALUMINUM COMPANY OF AMERICA.

As will be apparent from the date shown in Table 1, $\rho$-alumina is substantially different from an alumina cement and it does not contain CaO. Accordingly, when it is used for a castable refractory, the above-mentioned defects owing to CaO are not caused at all. More specifically, since $\rho$-alumina is composed of $Al_2O_3$, if a silica-alumina type aggregate, for example, is employed, the castable composition has an $SiO_2$-$Al_2O_3$ system and such problems as reduction of the heat resistance and formation of gehlenite and anorthite are not caused at all, and it is construed that the resistance to $Cl_2$ gas is high. Further, by virtue of water-hardenability of ρ-alumina and its characteristic property that it is converted under heating to stable α-alumina, ρ-alumina is very valuable as the binder for a castable refractory composition.

ρ-Alumina is now compared with an alumina cement with respect to the preparation process. An alumina cement is ordinarily prepared by adding lime stone to bauxite or alumina, melting or sintering the mixture at a temperature higher than 1400° C. in an electric furnace, a reverberatory furnace or a rotary kiln to form a cullet or clinker and pulverizing the cullet orhclinker. ρ-Alumina is prepared by contacting alumina trihydrate from Bayer's process with a hot gas heated at about 400° to about 1200° C. for about 0.2 to about 10 seconds or by maintaining alumina trihydrate at about 250° to about 900° C. under reduced pressure for 1 minute to 4 hours to effect partial dehydration. In case of KHP-2, alumina trihydrate is contacted with a hot gas at 600° to 700° C. for several seconds and is then pulverized. Accordingly, ρ-alumina can be prepared more easily than the alumina cement.

In the castable refractory composition of the present invention, ρ-alumina is incorporated into an aggregate in an amount of at least 0.6% by weight (at least 1% as KHP-2). When fumed silica or glass powder as a binding assistant and a dispersant are used in combination, ρ-alumina is incorporated in an amount of at least 0.3% by weight (at least 0.5% by weight as KHP-2). When the amount of ρ-alumina is smaller than the above critical value, the room temperature hardenability is reduced and removal of a molding frame from a cast product becomes difficult.

(2) Fumed Silica

The working time of a ρ-alumina-containing castable refractory composition is about 20 minutes at an ambient temperature of 20° C. and in general, the composition can be used without any trouble or disadvantage. However, in some application methods, a longer working time is required. Further, it sometimes is required that the strength at about 1000° C. should be improved. In such case, fumed silica may be added so as to attain the intended improvements. Fumed silica is obtained (a) by hydrolyzing silicon tetrachloride in an oxyhydrogen flame or (b) in the form of a by-product called "silica dust" in the process where metallic silicon or silicon alloy is prepared in an electric furnace. The product (a) has a high purity but the product (b) includes impurities such as alkalis and iron. Each product is composed of amorphous silica in the form of ultra-fine spherical particles. When fumed silica is added to ρ-alumina and the mixture is kneaded with water, the formed hydrate is a boehmite gel consisting of a mono- or di-hydrate of alumina, and formation of bayerite, i.e., a tri-hydrate, is hardly observed. This fact suggests that the quantity of bound water is reduced to lessen the quantity of water formed by dehydration under heating and properties are advantageously changed. Namely, the working time is prolonged, the workability is improved and a desirable water-reducing effect can be attained. Further, a part of fumed silica is vitrified while the temperature is elevated, and at a high temperature the fumed silica reacts with alumina to form mullite and make contributions to promotion of sintering of the refractory and improvement of the volume stability. Only for formation of mullite, Kibushi-clay, powdery siliceous sand or metallic silicon may be added, and the intended effect may be attained. When fumed silica is added, in addition to this effect, there can be attained such desirable effects as prolongation of the working time, reduction of water to be added, change of the state of the hydrate and manifestation of the strength in the intermediate temperature region.

When the amount incorporated of fumed silica exceeds 30% by weight as the outer percent of the castable refractory, the amount of water to be added is increased, the operability is worsened and the permanent linear change by fire at 1100° C. for 3 hours becomes high.

A preferred amount of fumed silica is 0.5 to 20% by weight as the outer percent. If the amount of fumed silica is at least 0.5% by weight, effects of prolonging the working time and improving the workability can be attained. Even if fumed silica is added in an amount larger than 20% by weight, the strength after fire at 1100° C. cannot be substantially improved.

(3) Dispersant

When a dispersant is incorporated into a castable refractory containing ρ-alumina as the binder, such effects as of improving the workability, reducing the amount of water to be added and increasing the strength can be attained, and if the dispersant is used in combination with fumed silica, these effects are further enhanced. As dispersants that can be effectively used, there can be mentioned, for example, inorganic substances such as alkali silicates and alkali phosphates, and organic substances such as dispersants for cement concretes (lignin sulfonic acid type dispersants, hydroxycarboxylic acid dispersants and alkyl-aryl sulfonic acid type dispersants). Reduction of the workability or bleeding is caused if the dispersant is incorporated in an amount larger than 2.0% by weight based on the sum of fine particles having a size less than 74μ in the castable refractory composition.

(4) Glass Powder

As pointed out hereinbefore, fumed silica is effective as the binding assistant. However, fumed silica having a high purity is expensive, or low-grade silica dust obtained when metallic silicon or silicon alloy is prepared is uneven in the quality. Further, since this low-grade silica dust is a by-product, stable supply cannot be expected. As a binding assistant that can be used as a substitute for such fumed silica, there can be effectively used glass powder.

A frit is most available as the glass powder. The frit is a powdery glass obtained by melting a silicate or phosphate or a mixture thereof, rapidly cooling the melting and pulverizing the resulting solid. This is characterized by water insolubility and a low melting point. In general, the softening point of the frit is 300° to 1000° C. Frits are used as glazes for porcelain enamels, jewelry enamels and earthwares and also as sealing materials for electronic parts. Frits of the borosilicate type or the sodium lime silicate type are popular.

A higher effect is attained as the particle size of the frit is smaller. However, a long time and a large quantity of energy are required to obtain a frit having a fine particle size. A frit having an average particle size of 10 to 150μ is readily available and hence, is conveniently used. It is preferred that the frit is incorporated in an amount of 0.2 to 8% by weight, especially 0.5 to 7% by weight. If the amount of the frit is smaller than 0.2% by weight, no substantial sintering effect can be attained. If the amount incorporated of the frit is larger than 8% by weight, the heat resistance becomes insufficient.

Results of comparative tests where glass powder is compared with various sintering assistants are shown in Table 2. In Table 2, samples 1 to 16 were prepared by adding a sintering assistant indicated in Table 2 into a basic composition comprising 88% by weight of a mullite type aggregate, 4% by weight of fired alumina and 8% by weight of KHP-2 (ρ-alumina manufactured and sold by Sumitomo Aluminum Seiren Kabushiki Kaisha) and firing the composition at 1100° C. The strength characteristics of each sample were determined.

TABLE 2

| Sample No. | Binding Assistant Kind | Particle Size (μ) | Amount (wt. % based on basic composition) | After firing at 1100° C. Modulus of rupture (Kg/cm²) | Crushing strength (Kg/cm²) |
|---|---|---|---|---|---|
| 1 | Si | below 44 | 6 | 4.6 | 63 |
| 2 | Fe—Si | below 44 | 6 | 3.1 | 48 |
| 3 | Si₃N₄ | below 74 | 4 | 5.4 | 80 |
| 4 | SiC | below 100 | 4 | 3.6 | 35 |
| 5 | glass powder of beer bottle | 12 (average) | 4 | 26.3 | 114 |
| 6 | glass powder of beer bottle | 6 (average) | 4 | 35.8 | 230 |
| 7 | powdery sodium silicate No. 3 | — | 0.5 | 18.0 | 107 |
| 8 | powdery sodium silicate No. 3 | — | 1 | 8.0 | 57 |
| 9 | borax | — | 1 | 3.6 | 43 |
| 10 | boric acid | — | 1 | 5.3 | 76 |
| 11 | powdery aluminum primary phosphate | — | 2 | not hardened at room temperature | |
| 12 | lead silicate type frit | below 150 | 2 | 49.7 | 238 |
| 13 | lead silicate type frit | below 150 | 4 | 87.5 | 324 |
| 14 | barium borosilicate type frit | below 200 | 2 | 47.5 | 211 |
| 15 | barium borosilicate type frit | below 200 | 4 | 80.6 | 283 |
| 16 | not added | — | — | 2.9 | 31 |

From the results shown in Table 2, it is seen that glass powder of a beer bottle and a frit are effective as the sintering assistant and that especially high effects can be attained by the frit. it is construed that Si, Fe-Si, SiC, SiN₄ and the like will exert a binding effect at higher temperatures. Borates, phosphates and silicates customarily used as binders for refractory compositions are water-soluble, and if they are incorporated in large amounts, soluble components are considered to inhibit hardening of ρ-alumina and no substantial binding effect can be attained. Further, as is seen in case of glass powder of beer bottle, the binding effect of the additive is influenced by the particle size thereof. In case of frits, a high effect can be attained in a small amount even if particles are relatively coarse. In short, it is considered that water-insoluble glass powder having a high powdering degree and a low softening temperature is effective.

Experiments were conducted by using a commercially available frit to confirm the effects thereof. Obtained results are shown in Table 3.

In Table 3, samples 1 to 5 were prepared by incorporating a frit of the borosilicate type (average particle size=30μ, softening point=570° C.) in an amount indicated in Table 3 into a basic composition comprising SK 35 chamotte, fired alumina powder, sericite clay powder, KHP-2 (ρ-alumina sold and manufactured by Sumitomo Aluminum Seiren Kabushiki Kaisha) and a polyol type dispersant. The comparative sample was one free of the frit.

TABLE 3

| | Sample 1 | Sample 2 | Sample 3 | Sample 4 | Sample 5 | Comparative Sample |
|---|---|---|---|---|---|---|
| Composition (% by weight) | | | | | | |
| SK 35 chamotte | 82 | 82 | 82 | 82 | 82 | 82 |
| fired alumina | 5 | 5 | 5 | 5 | 5 | 5 |
| soricite | 3 | 3 | 3 | 3 | 3 | 3 |
| KHP-2 | 10 | 10 | 10 | 10 | 10 | 10 |
| dispersant | 0.3 | 0.3 | 0.3 | 0.3 | 0.3 | 0.3 |
| frit | 0.5 | 1 | 3 | 5 | 7 | 0 |
| Maximum Grain Size (mm) | 6 | 6 | 6 | 6 | 6 | 6 |
| Particle Size Distribution | (% by weight) | | | | | |
| above 1 mm | 48–53 | 48–53 | 47–52 | 46–51 | 46–51 | 48–53 |
| 1 mm–0.074 mm | 19–24 | 19–24 | 18–23 | 18–23 | 16–21 | 19–24 |
| below 0.074 mm | 23–28 | 23–28 | 25–30 | 26–31 | 28–33 | 23–28 |
| Amount of Water Added (%) | 12.8 | 12.8 | 12.8 | 13.0 | 13.1 | 12.8 |
| After Drying at 105° C. | | | | | | |
| modulus of rupture (Kg/cm²) | 37.4 | 35.3 | 31.9 | 32.3 | 29.5 | 36.7 |
| crushing strength (Kg/cm²) | 273 | 242 | 236 | 218 | 195 | 268 |
| After firing at 1100° C. | | | | | | |
| modulus of rupture (Kg/cm²) | 25.4 | 38.6 | 64.2 | 87.9 | 116 | 15.3 |
| crushing strength | 168 | 243 | 371 | 381 | 453 | 136 |

TABLE 3-continued

|  | Sample 1 | Sample 2 | Sample 3 | Sample 4 | Sample 5 | Comparative Sample |
|---|---|---|---|---|---|---|
| (Kg/cm$^2$) | | | | | | |
| Hot Modulus of Rupture (Kg/cm$^2$) at 1400° C. | 8.9 | 13.2 | 15.7 | 13.6 | 7.1 | 6.4 |

From the results shown in Table 3, it will readily be understood that the frit has no bad influence on the strength after drying at 105° C., improves the strength after firing at 1100° C. and also improves the hot strength at 1400° C.

(5) Aggregate

Any of aggregates except one reducing extremely the melting point by reaction with alumina can be used in the present invention. Namely, all of aggregates customarily used as prepared unshaped refractories can be used.
Examples are described below.
Acidic aggregates such as silica, zircon and zirconia:

From the viewpoint of the heat resistance, it may be considered that the use of a silica type aggregate will not be preferred because it has a eutectic point (1595° C.) with alumina. However, if the silica type aggregate is used at a lower temperature, a castable refractory product having a stable strength can be obtained. When fused silica is used as the aggregate, the spalling resistance can be especially improved. When foamed silica is used, a light weight refractory product can be produced.

Neutral aggregates such as chromia, alumina, mullite, sillimanite, silica-alumina grog, silicon carbide, carbon, cordierite, spinel, chromite group ore, nitrides and borides:

In any of these neutral aggregates, the heat resistance is not degraded by incorporation of p-alumina. They are most popular aggregates.

Basic aggregates such as magnesia and magnesia-chromia grog:

These aggregates react with alumina at high temperatures to form spinel, whereby sintering is promoted and stabilization is effected.

Heat-insulating aggregates such as bubbled alumina, foamed silica, bubbled zirconia, light weight chamotte, ceramic fibers, pearlite, vermiculite, saw dusts, rice hulls and foamed styrol:

Combustible substances such as saw dusts and rice hulls can be used as aggregates. When KHP-2 (p-alumina manufactured and sold by Sumitomo Aluminum Seiren Kabushiki Kaisha) is incorporated in an amount of about 90% by weight into such an aggregate as saw dusts, rice hulls or foamed styrol, the resulting product can be used as a heat-insulating refractory. Further, good results are obtained when an air entraining agent or blowing agent is used in combination with a heat-insulating aggregate.

The particle size and the particle size distribution of the aggregate are important. These factors are determined according to the intended application method such as casting, trowel working or gun working or while taking physical properties such as the strength and volume stability into consideration, as in case of ordinary castable refractories. Since the castable refractory of the present invention is not fired, it may be required to improve the resistance to shrinkage by heating and cooling at the firing step. For this purpose, the use of a sillimanite material such as kyanite and andalusite is effective as in case of ordinary castable refractories. Furthermore, as in case of ordinary castable refractories, the use of a clay or a fine powder of an aggregate, especially a clay or aggregate powder having a size smaller than 2μ, is effective for delicate adjustment of the workability.

The present invention will now be described in detail by reference to the following Examples.

EXAMPLE 1

The strength characteristics of a castable refractory comprising 30% by weight of KHP-2 (p-alumina) incorporated in an aggregate (electrofused alumina) were examined.

(a) Composition and Particle Size Distribution of Castable Refractory

The composition and particle size distribution of the castable refractory were as shown in Table 2.

TABLE 4

| Composition (%) | |
|---|---|
| Aggregate (electrofused alumina) | 70 |
| KHP-2 | 30 |
| Particle Size Distribution (%) | |
| above 1 mm | 30-35 |
| 1-0.074 mm | 27-32 |
| below 0.074 mm | 33-38 |
| maximum particle size | 4 mm |
| Amount of Water Added (%) | |
| 21.5 | |

Note
KHP-2: a product sold and manufactured by Sumitomo Aluminum Seiron Kabushiki Kaisha, which contains about 60% of p-alumina; same in the subsequent Examples In this and subsequent Examples, the tests of castable refractory compositions were carried out according to methods of JIS R-2552, R-2553, R-2554, R-2652, R-2653, R-2654 and R-2655.

(b) Strength Characteristics

The strength characteristics of the above refractory compositions were determined to obtain results shown in Table 5.

TABLE 5

| | Physical Properties | | | |
|---|---|---|---|---|
| Treatment Conditions | Permanent Linear Change (%) | Bulk Specific Gravity | Modulus of Rupture (Kg/cm$^2$) | Crushing Strength (Kg/cm$^2$) |
| cured at 10° C. for 24 hours | — | 2.37 | 5.2 | 17 |
| dried at 105° C. for 24 hours | −0.06 | 2.17 | 34.0 | 137 |

TABLE 5-continued

| Treatment Conditions | Physical Properties | | | |
|---|---|---|---|---|
| | Permanent Linear Change (%) | Bulk Specific Gravity | Modulus of Rupture (Kg/cm$^2$) | Crushing Strength (Kg/cm$^2$) |
| fired at 300° C. for 3 hours | −0.15 | 2.11 | 32.0 | 234 |
| fired at 800° C. for 3 hours | −0.30 | 2.04 | 15.0 | 137 |
| fired at 1000° C. for 3 hours | −0.32 | 2.04 | 11.0 | 98 |
| fired at 1100° C. for 3 hours | −0.44 | 2.04 | 3.9 | 21 |
| fired at 1200° C. for 3 hours | −0.56 | 2.05 | 4.3 | 28 |
| fired at 1400° C. for 3 hours | −0.87 | 2.08 | 5.1 | 22 |

EXAMPLE 2

In this Example, the effect by addition of fumed silica was examined.

(a) Fumed silica was incorporated in an amount of 0 to 30% by weight (as the outer percent) into a composition comprising 15% by weight of KHP-2 (p-almina) and 85% by weight of fired bauxite. The working time, the workability, the amount of added water and physical properties after firing at 1100° C. for 3 hours were determined with respect to each sample to obtain results shown in Table 6. Incidentally, the working time was measured at an ambient temperature of 20° C.

TABLE 6

| | Sample No. | | | | | | | | |
|---|---|---|---|---|---|---|---|---|---|
| | 1 | 2 | 3 | 4 | 5 | 6 | 7 | 8 | 9 |
| Composition (%) | | | | | | | | | |
| aggregate | 85 | 85 | 85 | 85 | 85 | 85 | 85 | 85 | 85 |
| KHP-2 | 15 | 15 | 15 | 15 | 15 | 15 | 15 | 15 | 15 |
| fumed silica | 0 | 1 | 3 | 5 | 10 | 15 | 20 | 25 | 30 |
| Particle Size Distribution (%) | | | | | | | | | |
| above 1 mm | 50–55 | 50–55 | 48–53 | 47–52 | 45–50 | 43–48 | 41–46 | 40–45 | 38–43 |
| 1 mm–0.074 mm | 20–25 | 20–25 | 20–25 | 19–24 | 19–24 | 18–23 | 17–22 | 16–21 | 15–20 |
| below 0.074 mm | 20–25 | 20–25 | 22–27 | 24–29 | 26–31 | 29–34 | 32–37 | 34–39 | 37–42 |
| Maximum Grain Size (mm) | 6 | 6 | 6 | 6 | 6 | 6 | 6 | 6 | 6 |
| Amount of Water Added (%) | 16.2 | 16.2 | 15.4 | 14.5 | 13.7 | 13.5 | 13.0 | 13.5 | 15.9 |
| Workability | fair | good | good | good | good | good | fair | fair | bad |
| Working Time (minutes) | 20 | 50 | 60 | 50 | 50 | 50 | 40 | 40 | 40 |
| Permanent Linear Change (%) | −0.32 | −0.32 | −0.36 | −0.40 | −0.81 | −1.07 | −1.24 | −1.43 | −1.91 |
| Bulk Specific Gravity | 2.22 | 2.21 | 2.20 | 2.30 | 2.24 | 2.25 | 2.27 | 2.23 | 2.10 |
| Modulus of Rupture (Kg/cm$^2$) | 1.7 | 5.0 | 21.0 | 61.1 | 64.2 | 70.9 | 67.3 | 64.8 | 57.7 |
| Crushing Strength (Kg/cm$^2$) | 14 | 45 | 105 | 351 | 357 | 373 | 328 | 288 | 206 |

TABLE 7

| Amount Added (%) | Modulus of Rupture, Kg/cm$^2$ (Crushing Strength Kg/cm$^2$) | | |
|---|---|---|---|
| | fused silica powder | kibushi-clay | fumed silica |
| 0 | 1.7 (14) | 1.7 (14) | 1.7 (14) |
| 1 | 2.0 (18) | 4.1 (35) | 5.0 (45) |
| 3 | 2.0 (18) | 8.1 (47) | 21.0 (105) |
| 5 | 1.5 (16) | 10.6 (75) | 61.1 (351) |
| 8 | 2.6 (21) | 18.3 (132) | 62.3 (356) |

From the results shown in Table 7, it will readily be understood that an especially good strength can be From the results shown in Table 6, it will readily be understood that the modulus of rupture and Crushing strength can be increased by incorporation of fumed silica and that the amount of water to be added can be reduced and the working time can be prolonged by incorporation of fumed silica. However, if the amount of fumed silica exceeds 30% by weight (as the outer percent), the amount of water to be added is increased and the workability is reduced.

(b) Fused silica powder, kibushi-clay or fumed silica having a particle size smaller than 44μ was incorporated in an amount (as the outer percent) indicated in Table 7 into a composition comprising 15% by weight of KHP-2 (p-alumina) and 85% by weight of an aggregate (bauxite), and the mixture was fired at 1100° C. and the modulus of rupture and crushing strength were determined to obtain results shown in Table 7.

increased in the intermediate temperature region in case of fumed silica over in case of fused silica powder or kibushi-clay.

EXAMPLE 3

The effects of dispersants were examined in this Example.

A dispersant for concretes (a surface active agent of the polyalkylaryl-sulfonic acid salt type) or sodium metaphosphate or sodium silicate as an inorganic dispersant was incorporated in an amount indicated in Table 8-A (as the outer percent) into a composition comprising 10% by weight of KHP-2 (p-alumina), 80% by weight of fired bauxite as the aggregate and 10% by weight of fired alumina. The amount of water to be added and physical properties of the product obtained by drying the composition at 105° C. for 24 hours were determined to obtain results shown in Table 8-A. Namely, this Table illustrates results obtained when dispersants alone were incorporated without addition of fumed silica.

Separately, fumed silica was incorporated in an amount of 10% by weight (as the outer percent) into a composition comprising 15% by weight of KHP-2 (ρ-alumina) and 85% by weight of an aggregate (fired bauxite) to form a basic refractory composition. Then, a dispersant for concretes (a surface active agent of the polyalkylarylsulfonic acid salt type) was added to the basic composition in an amount of 0 to 0.6% by weight based on the sum of fine particles having a particle size smaller than 74μ in the basic refractory composition. Separately, sodium metaphosphate as an inorganic dispersant was added to the basic refractory composition in an amount of 0.2% by weight based on the sum of fine particles having a particle size smaller than 74μ in the basic refractory composition. With respect to each sample, the workability, the amount of water to be added and physical properties after drying at 105° C. for 24 hours were determined to obtain results shown in Table 8-B. Namely, this Table illustrates effects of dispersants to the system of (ρ-alumina+aggregate+fumed silica).

proved by incorporation of an organic or inorganic dispersant and simultaneously, the strength after drying is increased and the amount of water to be added is reduced. Further, the modulus of rupture is improved by the combined use of the dispersant with fumed silica over the modulus of rupture attained by the single use of the dispersant.

EXAMPLE 4

In the Example, experiments were carried out in order to know a minimum necessary amount of ρ-alumina as the binder.

More specifically, the amount added to KHP-2 (ρ-alumina) was gradually added and the point at which removal from the molding frame and the strength after drying at 105° C. for 24 hours were determined to obtain results shown in Tables 9-A and 9-B. Samples were formed by incorporating KHP-2 (ρ-alumina) into an aggregate composed of electrofused alumina and fired alumina while changing the amount of KHP-2, and they were cast-molded to have a size of 40 mm×40 mm×160 mm. Items shown in Tables 9-A and 9-B were tested, and obtained results are shown in these Tables.

TABLE 8-A

| | Sample No. | | | | | | |
|---|---|---|---|---|---|---|---|
| | 1 | 2 | 3 | 4 | 5 | 6 | 7 |
| Composition (%) | | | | | | | |
| aggregate | 80 | 80 | 80 | 80 | 80 | 80 | 80 |
| fired alumina | 10 | 10 | 10 | 10 | 10 | 10 | 10 |
| KHP-2 | 10 | 10 | 10 | 10 | 10 | 10 | 10 |
| dispersant for concretes | — | 0.12 | — | — | — | — | — |
| sodium metaphosphate | — | — | 0.20 | 0.60 | 1.20 | — | — |
| sodium silicate | — | — | — | — | — | 0.60 | 2.0 |
| Particle Size Distribution | | | | | | | |
| above 1 mm | 48–53 | 48–53 | 48–53 | 48–53 | 48–53 | 48–53 | 48–53 |
| 1 mm–0.074 mm | 19–24 | 19–24 | 19–24 | 19–24 | 19–24 | 19–24 | 19–24 |
| below 0.074 mm | 23–28 | 23–28 | 23–28 | 23–28 | 23–28 | 23–28 | 23–28 |
| Maximum particle size (mm) | 6 | 6 | 6 | 6 | 6 | 6 | 6 |
| Amount of Water Added (%) | 14.2 | 12.6 | 12.6 | 12.0 | 12.6 | 13.6 | 13.5 |
| Permanent Linear Change (%) | −0.17 | −0.11 | −0.08 | −0.06 | −0.05 | −0.12 | −0.18 |
| Bulk Specific Gravity | 2.41 | 2.54 | 2.57 | 2.57 | 2.60 | 2.44 | 2.46 |
| Modulus of Rupture (Kg/cm$^2$) | 13.9 | 31.3 | 37.4 | 58.3 | 15.1 | 21.2 | 17.4 |
| Crushing Strength (Kg/cm$^2$) | 51 | 213 | 337 | 364 | 151 | 157 | 159 |

Note
The amount of the dispersant was % by weight based on the sum of fine particles having a particle size smaller than 74 μ.

TABLE 8-B

| | Sample No. | | | | | | | | |
|---|---|---|---|---|---|---|---|---|---|
| | 1 | 2 | 3 | 4 | 5 | 6 | 7 | 8 | 9 |
| Composition (%) | | | | | | | | | |
| aggregate | 85 | 85 | 85 | 85 | 85 | 85 | 85 | 85 | 85 |
| KHP-2 | 15 | 15 | 15 | 15 | 15 | 15 | 15 | 15 | 15 |
| fumed silica | 10 | 10 | 10 | 10 | 10 | 10 | 10 | 10 | 10 |
| dispersant for concretes | 0 | 0.01 | 0.05 | 0.10 | 0.20 | 0.30 | 0.50 | 0.60 | — |
| sodium metaphosphate | — | — | — | — | — | — | — | — | 0.20 |
| Particle Size Distribution (%) | | | | | | | | | |
| above 1 mm | 45–50 | 45–50 | 45–50 | 45–50 | 45–50 | 45–50 | 45–50 | 45–50 | 45–50 |
| 1 mm–0.074 mm | 19–24 | 19–24 | 19–24 | 19–24 | 19–24 | 19–24 | 19–24 | 19–24 | 19–24 |
| below 0.074 mm | 26–31 | 26–31 | 26–31 | 26–31 | 26–31 | 26–31 | 26–31 | 26–31 | 26–31 |
| Maximum particle size (mm) | 6 | 6 | 6 | 6 | 6 | 6 | 6 | 6 | 6 |
| Amount of Water Added (%) | 13.2 | 12.7 | 11.7 | 11.7 | 11.2 | 10.9 | 10.7 | 10.7 | 11.5 |
| Workability | good | good | excellent | excellent | excellent | good | good | bad | excellent |
| Permanent Linear Change (%) | −0.19 | −0.13 | −0.10 | −0.11 | −0.13 | −0.07 | −0.10 | −0.05 | −0.06 |
| Bulk Specific Gravity | 2.29 | 2.31 | 2.40 | 2.39 | 2.46 | 2.49 | 2.48 | 2.46 | 2.43 |
| Modulus of Rupture (Kg/cm$^2$) | 51.7 | 52.1 | 65.1 | 55.5 | 50.9 | 54.9 | 51.9 | 44.7 | 60.3 |
| Crushing Strength (Kg/cm$^2$) | 291 | 310 | 450 | 390 | 421 | 460 | 421 | 297 | 432 |

Note
Each of the amounts of the dispersant for concretes and sodium metaphosphate was % by weight based on the sum of particles having a particle size smaller than 74 μ.

From the results shown in Tables 8-A and 8-B, it will readily be understood that the workability can be im-

TABLE 9-A

|  | Sample No. | | | |
|---|---|---|---|---|
|  | 1 | 2 | 3 | 4 |
| Composition (%) | | | | |
| electrofused alumina | 86 | 86 | 86 | 86 |
| fired alumina | 10 | 12 | 13 | 13.5 |
| KHP-2 | 4 | 2 | 1 | 0.5 |
| Particle Size Distribution (%) | | | | |
| above 1 mm | 50–55 | 50–55 | 50–55 | 50–55 |
| 1 mm–0.074 mm | 20–25 | 20–25 | 20–25 | 20–25 |
| below 0.074 mm | 20–25 | 20–25 | 20–25 | 20–25 |
| Maximum particle size (mm) | 6 | 6 | 6 | 6 |
| Amount of Water Added (%) | 9.2 | 8.5 | 8.3 | 8.2 |
| Time Necessary for Enabling Removal from Frame (hours) at curing at 20° C. and 90% RH | 30 | 36 | 48 | removal impossible after 48 hrs. |
| After Drying at 105° C. for 24 Hours | | | | |
| bulk specific gravity | 2.83 | 2.89 | 2.94 | — |
| modulus of rupture (Kg/cm$^2$) | 10.0 | 5.5 | 3.0 | — |
| crushing strength (Kg/cm$^2$) | 45 | 24 | 13 | — |

TABLE 9-B

|  | Sample No. | | |
|---|---|---|---|
|  | 5 | 6 | 7 |
| Composition (%) | | | |
| aggregate | 85 | 85 | 85 |
| fired alumina | 12 | 12.5 | 12.7 |
| KHP-2 | 1 | 0.5 | 0.3 |
| fumed silica | 2 | 2 | 2 |
| sodium metaphosphate | 0.12 | 0.12 | 0.12 |
| Particle Size Distribution (%) | | | |
| above 1 mm | 48–53 | 48–53 | 48–53 |
| 1 mm–0.074 mm | 20–25 | 20–25 | 20–25 |
| below 0.074 mm | 22–27 | 22–27 | 22–27 |
| Maximum particle size (mm) | 6 | 6 | 6 |
| Amount of Water Added (%) | 8.3 | 8.4 | 8.3 |
| Time Necessary for Enabling Removal from Frame (hours) at curing at 20° C. and 90% RH | 40 | 48 | removal impossible after 48 hours |
| After Drying at 105° C. | | | |
| bulk specific gravity | 2.72 | 2.75 | — |
| modulus of rupture (Kg/cm$^2$) | 7.2 | 6.1 | — |
| Crushing strength (Kg/cm$^2$) | 48 | 43 | — |

In Tables 9-A and 9-B, the amount added of the dispersant was as defined in Example 3.

From the results shown in Tables 9-A and 9-B, it will readily be understood that in case of a system including the aggregate and p-alumina, by incorporation of at least 1% of KHP-2 (at least 0.6% as p-alumina) removal from the molding frame becomes possible (room temperature hardenability can be attained), and in case of a system including the aggregate, p-alumina and fumed silica, by incorporation of at least 0.5% of KHP-2 (at least 0.3% as p-alumina) removal from the molding frame becomes possible. Even if the amount added of p-alumina is smaller, the effects of fumed silica as the binding assistant and the dispersant are apparently attained. Namely, the amount of p-alumina necessary for attaining room temperature hardenability can be reduced and the strength after drying is increased. The strength after drying should naturally be reduced as the amount of p-alumina is decreased.

EXAMPLE 5

A castable refractory composition comprising p-alumina as the binder was compared with a castable refractory composition comprising an alumina cement as the binder with respect to physical properties.

(a) A mixture of fired bauxite and kyanite was used as the aggregate, and p-alumina (sample) or an alumina cement (comparative sample) was incorporated into the aggregate in an amount of 12%. Physical properties of the resulting refractory compositions were determined to obtain results shown in Table 10.

CA-25 and first class alumina cement of JIS were used as the alumina cement. Further, fumed silica and a dispersant were incorporated into the p-alumina-containing composition. A surface active agent of the polyalkylaryl-surfonic acid salt type for concretes was used as the dispersant. In Table 10, the amount of the dispersant was % by weight based on fine particles having a particle size smaller than 74μ.

TABLE 10

|  | Sample 1 | Comparative Sample 1 | Comparative Sample 2 |
|---|---|---|---|
| Composition (%) | | | |
| fired bauxite | 73 | 80 | 80 |
| kyanite | 8 | 8 | 8 |
| KHP-2 | 12 | | |
| CA-25 | | 12 | |
| JIS first class alumina cement | | | 12 |
| fumed silica | 7 | | |
| dispersant | 0.15 | | |
| Particle Size Distribution (%) | | | |
| above 1 mm | 50–55 | 50–55 | 50–55 |
| 1 mm–0.074 mm | 17–22 | 17–22 | 17–22 |
| below 0.074 mm | 23–28 | 23–28 | 23–28 |
| Maximum particle size (mm) | 6 | 6 | 6 |
| Amount of Water Added (%) | 10.7 | 10.0 | 11.5 |
| Permanent Linear Change (%) | | | |
| 105° C. × 24 hrs. | −0.08 | −0.07 | −0.06 |
| 1000° C. × 3 hrs. | −0.42 | −0.13 | −0.15 |
| 1400° C. × 3 hrs. | −0.45 | −1.21 | −1.03 |
| 1700° C. × 3 hrs. | −0.28 | −5.70 | −5.26 |
| Bulk Specific Gravity | | | |
| 105° C. × 24 hrs. | 2.50 | 2.62 | 2.55 |
| 1000° C. × 3 hrs. | 2.44 | 2.57 | 2.50 |
| 1400° C. × 3 hrs. | 2.45 | 2.62 | 2.51 |
| 1700° C. × 3 hrs. | 2.46 | 3.02 | 2.83 |
| Modulus of Rupture (Kg/cm$^2$) | | | |
| 105° C. × 24 hrs. | 54.5 | 49.3 | 59.3 |
| 1000° C. × 3 hrs. | 68.0 | 30.9 | 34.7 |
| 1400° C. × 3 hrs. | 54.6 | 82.2 | 79.8 |
| 1700° C. × 3 hrs. | 91.0 | 487 | 469 |
| Crushing Strength (Kg/cm$^2$) | | | |
| 105° C. × 24 hrs. | 368 | 172 | 196 |
| 1000° C. × 3 hrs. | 539 | 183 | 175 |
| 1400° C. × 3 hrs. | 359 | 389 | 285 |
| 1700° C. × 3 hrs. | 466 | >1000 | >1000 |
| Hot Modulus of Rupture (Kg/cm$^2$) at 1400° C. | 11.2 | 5.3 | 2.9 |

(b) A mixture of SK 35 chamotte, fired alumina and kyanite was used as the aggregate, and as the binder, KHP-2 (p-alumina) was incorporated in an amount of 15% by weight with fumed silica (sample). Separately, an alumina cement (CA-25) was incorporated in an amount of 15% by weight into the aggregate (comparative sample). The physical properties of both the samples were determined and compared to obtain results shown in Table 11. The kind and amount of the dispersant were the same as in (a) above.

TABLE 11

|  | Sample 2 | Comparative Sample 3 |
|---|---|---|
| Composition (%) | | |
| SK 35 | 63 | 68 |
| fired alumina | 7 | 7 |
| kyanite | 10 | 10 |
| KHP-2 | 15 | |
| CA-25 | | 15 |
| fumed silica | 5 | |
| dispersant | 0.15 | |
| Particle Size Distribution (%) | | |
| above 1 mm | 45–50 | 45–50 |
| 1 mm–0.074 mm | 15–20 | 15–20 |
| below 0.074 mm | 30–35 | 30–35 |
| Maximum particle size (mm) | 6 | 6 |
| Amount of Water Added (%) | 11.5 | 10.5 |
| Permanent Linear Change (%) | | |
| 105° C. × 24 hrs. | −0.08 | −0.05 |
| 1000° C. × 3 hrs. | −0.20 | −0.32 |
| 1400° C. × 3 hrs. | −0.39 | −0.55 |
| 1500° C. × 3 hrs. | −0.23 | −1.32 |
| Bulk Specific Gravity | | |
| 105° C. × 24 hrs. | 2.18 | 2.24 |
| 1000° C. × 3 hrs. | 2.09 | 2.17 |
| 1400° C. × 3 hrs. | 2.09 | 2.19 |
| 1500° C. × 3 hrs. | 2.04 | 2.28 |
| Modulus of Rupture (Kg/cm$^2$) | | |
| 105° C. × 24 hrs. | 64.6 | 49.5 |
| 1000° C. × 3 hrs. | 49.9 | 38.0 |
| 1400° C. × 3 hrs. | 70.0 | 121 |
| 1500° C. × 3 hrs. | 48.1 | 202 |
| Crushing Strength (Kg/cm$^2$) | | |
| 105° C. × 24 hrs. | 450 | 166 |
| 1000° C. × 3 hrs. | 473 | 164 |
| 1400° C. × 3 hrs. | 370 | 271 |
| 1500° C. × 3 hrs. | 289 | 862 |
| Hot Modulus of Rupture (Kg/cm$^2$) at 1400° C. | 23.4 | 12.3 |

(c) A mixture of sea water magnesia clinker and fired alumina was used as the aggregate, and as the binder was used 10% by weight of KHP-2 (ρ-alumina) with fumed silica (sample). Separately, 10% by weight of an alumina cement (CA-25) was incorporated as the binder (comparative sample). Physical properties of both the samples were examined and compared to obtain results shown in Table 12. The kind and amount of the dispersant were as described in (a) above.

TABLE 12

|  | Sample 3 | Comparative Sample 4 |
|---|---|---|
| Composition (%) | | |
| sea water magnesia clinker | 77 | 77 |
| fired alumina | 12 | 13 |
| KHP-2 | 10 | |
| CA-25 | | 10 |
| fumed silica | 1 | |
| dispersant | 0.10 | |
| Particle Size Distribution (%) | | |
| above 1 mm | 50–55 | 50–55 |
| 1 mm–0.074 mm | 17–22 | 17–22 |
| below 0.074 mm | 23–28 | 23–28 |
| Maximum particle size (mm) | 6 | 6 |
| Amount of Water Added (%) | 9.8 | 7.8 |
| Permanent Linear Change (%) | | |
| 105° C. × 24 hrs. | −0.05 | +0.02 |
| 1000° C. × 3 hrs. | −0.09 | +0.10 |
| 1400° C. × 3 hrs. | −0.62 | +2.04 |
| 1700° C. × 3 hrs. | −2.26 | −2.75 |
| Bulk Specific Gravity | | |
| 105° C. × 24 hrs. | 2.56 | 2.69 |
| 1000 ° C. × 3 hrs. | 2.51 | 2.64 |
| 1400° C. × 3 hrs. | 2.58 | 2.49 |
| 1700° C. × 3 hrs. | 2.73 | 2.92 |
| Modulus of Rupture (Kg/cm$^2$) | | |
| 105° C. × 24 hrs. | 62.2 | 22.4 |
| 1000° C. × 3 hrs. | 14.7 | 9.4 |
| 1400° C. × 3 hrs. | 41.5 | 36.0 |
| 1700° C. × 3 hrs. | 27.6 | 121 |
| Crushing Strength (Kg/cm$^2$) | | |
| 105° C. × 24 hrs. | 248 | 93 |
| 1000° C. × 3 hrs. | 188 | 141 |
| 1400° C. × 3 hrs. | 357 | 149 |
| 1700° C. × 3 hrs. | 126 | 585 |
| Hot Modulus of Rupture (Kg/cm$^2$) at 1400° C. | 11.3 | 12.0 |

(d) A mixture of electrofused bubbled alumina, fired bauxite and kyanite was used as the aggregate, and KHP-2 (ρ-alumina) was incorporated in an amount of 25% by weight as the binder with fumed silica (sample). Separately, an alumina cement (CA-25) was incorporated as the binder (comparative sample). Physical properties of both the samples were examined and compared to obtain results shown in Table 13. The kind and amount of the dispersant were as described in (a) above.

TABLE 13

|  | Sample 4 | Comparative Sample 5 |
|---|---|---|
| Composition (%) | | |
| electrofused bubbled alumina | 45 | 45 |
| fired bauxite | 5 | 13 |
| kyanite | 17 | 17 |
| KHP-2 | 25 | |
| CA-25 | | 25 |
| fumed silica | 8 | |
| dispersant | 0.15 | |
| Particle Size Distribution (%) | | |
| above 1 mm | 40–45 | 40–45 |
| 1 mm - 0.074 mm | 13–18 | 13–18 |
| below 0.074 mm | 37–42 | 37–42 |
| Maximum particle size (mm) | 5 | 5 |
| Amount of Water Added (%) | 23.0 | 19.3 |
| Permanent Linear Change (%) | | |
| 105° C. × 24 hrs. | −0.10 | −0.09 |
| 1000° C. × 3 hrs. | −0.27 | −0.28 |
| 1400° C. × 3 hrs. | +0.02 | −0.72 |
| 1600° C. × 3 hrs. | −0.64 | −5.31 |
| Bulk Specific Gravity | | |
| 105° C. × 24 hrs. | 1.32 | 1.55 |
| 1000° C. × 3 hrs. | 1.26 | 1.52 |
| 1400° C. × 3 hrs. | 1.25 | 1.54 |
| 1600° C. × 3 hrs. | 1.29 | 1.72 |
| Modulus of Rapture (Kg/cm$^2$) | | |
| 105° C. × 24 hrs. | 34.4 | 50.7 |
| 1000° C. × 3 hrs. | 23.5 | 42.6 |
| 1400° C. × 3 hrs. | 14.5 | 72.5 |
| 1600° C. × 3 hrs. | 14.5 | 170 |
| Crushing Strength (Kg/cm$^2$) | | |
| 105° C. × 24 hrs. | 147 | 140 |
| 1000° C. × 3 hrs. | 128 | 128 |
| 1400° C. × 3 hrs. | 89 | 188 |
| 1600° C. × 3 hrs. | 68 | 548 |

(e) A mixture of SK 35 light weight chamotte and kyanite or a mixture further comprising SK 35 chamotte was used as the aggregate, and KHP-2 (ρ-alumina) was added as the binder with fumed silica (sample). Separately, an alumina cement (CA-25) was added to the above aggregate as the binder (comparative sample). Physical properties of both the samples were examined and compared to obtain results shown in Table 14. A surface active agent of the lignin-sulfonic acid salt type was used as the dispersant in an amount indicated in Table 14 (% by weight based on the sum of fine particles having a size smaller than 74μ).

TABLE 14

|  | Sample 5 | Comparative Sample 6 |
|---|---|---|
| Composition (%) | | |
| SK 35 light weight chamotte | 50 | 50 |
| SK 35 chamotte | | 8 |
| kyanite | 17 | 17 |
| KHP-2 | 25 | |
| CA | | 25 |
| fumed silica | 8 | |
| dispersant | 0.30 | |
| Particle Size Distribution (%) | | |
| above 1 mm | 40–45 | 40–45 |
| 1 mm - 0.074 mm | 15–20 | 15–20 |
| below 0.074 | 35–40 | 35–40 |
| Maximum particle size (mm) | 3 | 3 |
| Amount of Water Added (%) | 28.7 | 27.1 |
| Permanent Linear Change (%) | | |
| 105° C. × 24 hrs. | −0.16 | −0.23 |
| 1000° C. × 3 hrs. | −0.44 | −0.56 |
| 1400° C. × 3 hrs. | −1.55 | −1.59 |
| 1500° C. × 3 hrs. | −1.92 | −5.65 |
| Bulk Specific Gravity | | |
| 105° C. × 24 hrs. | 1.53 | 1.63 |
| 1000° C. × 3 hrs. | 1.47 | 1.56 |
| 1400° C. × 3 hrs. | 1.51 | 1.59 |
| 1500° C. × 3 hrs. | 1.55 | 1.82 |
| Modulus of Rupture (Kg/cm$^2$) | | |
| 105° C. × 24 hrs. | 48.5 | 38.1 |
| 1000° C. × 3 hrs. | 35.6 | 22.5 |
| 1400° C. × 3 hrs. | 50.7 | 45.4 |
| 1500° C. × 3 hrs. | 78.8 | 113 |
| Crushing Strength (Kg/cm$^2$) | | |
| 105° C. × 24 hrs. | 204 | 111 |
| 1000° C. × 3 hrs. | 208 | 89 |
| 1400° C. × 3 hrs. | 205 | 120 |
| 1500° C. × 3 hrs. | 246 | 367 |

From the results shown in Tables 10 to 14, it will readily be understood that a castable refractory composition comprising a mixture of bauxite and SK 35 chamotte as the aggregate and ρ-alumina as the binder is excellent over a castable refractory composition comprising the same aggregate and an alumina cement as the binder with respect to the hot modulus of rupture (1400° C.). It will also be understood that in all the compositions comprising ρ-alumina as the binder the permanent linear change is within ±1% and the shrinkage at high temperature is reduced and they can be used under high temperature conditions more effectively than comparative compositions comprising an alumina cement as the binder. Furthermore, also in heat-insulating castable refractory compositions comprising bubbled alumina or light weight chamotte as the aggregate, the shrinkage at high temperatures is reduced by the use of ρ-alumina and also in this point, the products of the present invention are superior to the comparative products. Moreover, the products of the present invention have a lower bulk specific gravity than the comparative products, and therefore, the heat-insulating castable refractory compositions of the present invention are more advantageous over the comparative compositions. When a basic magnesia aggregate is employed, the permanent linear change is stable in the samples of the present invention, and the drastic change of the state from expansion after firing at 1400° C. to shrinkage after firing at 1700° C., such as observed in the conventional samples, is not caused in the samples of the present invention.

EXAMPLE 6

In this Example, the corrosion resistance was examined.

Samples

A mixture of SK 35 chamotte, fired alumina and kyanite was used as the aggregate, and ρ-alumina (sample) or an alumina cement CA-25 (comparative sample) JIS first class alumina cement (comparative sample) was incorporated as the binder in an amount of 15% by weight into the aggregate. Further, fumed silica and a dispersant were further incorporated in the ρ-alumina-containing sample. Sodium polyphosphate was used as the dispersant in an amount expressed in terms of % by weight based on the sum of fine particles having a size smaller than 74μ.

Test Procedures

According to the standard of JRS-211 (JRS: the standard specified by the Japanese Refractory Technical Association), the corrosion resistance was examined by the crucible method. More specifically, a cube having a size of 60 mm, in which a cylindrical hole having a diameter of 30 mm and including a semi-spherical top 15 mm in the radius was formed on one surface, was prepared from each sample according to the casting method on one surface, was prepared from each sample according to the casting method. The cast product was cured for 1 day and dried at 105° C. for 1 day to form a specimen to be subjected to the corrosion resistance test. Slag (33.4% of CaO and 14.6% of SiO$_2$) or steel (S-25C according to JIS) was charged in an amount of 25 g into the hole of the specimen, and the temperature was elevated in the open air in an electric furnace and the specimen was maintained at 1500° or 1550° C. for 3 hours. The corrosion ratio and permeation ratio were determined to obtain results shown in Table 15.

TABLE 15

|  | Sample 6 | Comparative Sample 7 | Comparative Sample 8 |
|---|---|---|---|
| Composition (%) | | | |
| SK 35 chamotte | 63 | 63 | 68 |
| fired alumina | 7 | 12 | 7 |
| kyanite | 10 | 10 | 10 |
| KHP-2 | 15 | — | — |
| CA-25 | — | 15 | — |
| JIS first class alumina cement | — | — | 15 |
| fumed silica | 5 | — | — |
| dispersant | 0.10 | — | — |
| Particle Size Distribution (%) | | | |
| above 1 mm | 45–50 | 45–50 | 45–50 |
| 1 mm–0.074 mm | 15–20 | 15–20 | 15–20 |
| below 0.074 mm | 30–35 | 30–35 | 30–35 |
| Maximum particle size (mm) | 6 | 6 | 6 |

TABLE 15-continued

|  |  | Sample 6 | Comparative Sample 7 | Comparative Sample 8 |  |
| --- | --- | --- | --- | --- | --- |
| Amount of Water Added (%) |  | 12.9 | 11.5 | 14.9 |  |
| Corrosion Resistance |  |  |  |  |  |
| slag CaO 33.4% SiO$_2$ 14.6% | corrosion ratio (%) | 36 | 34 | 48 | 25g of slag, 1500° C. × 3 hrs. |
|  | permeation ratio (%) | 1 | 10 | 22 |  |
| steel (JIS. S-25C) | corrosion ratio (%) | 0 | 20 | 29 | 25g of steel 1550° C. × 3 hrs. |
|  | permeation ratio (%) | 1 | 65 | 64 |  |

From the results shown in Table 15, it will readily be understood that in case of the resistance to slag, the ρ-alumina-containing castable refractory is comparable to the castable refractory containing an alumina cement (CA-25) with respect to the corrosion ratio but the permeation ratio of the former is much lower than the latter. Further, in case of the resistance to steel, the ρ-alumina-containing refractory is superior to the castable refractory containing JIS first class alumina cement with respect to both the corrosion ratio and the permeation ratio. As regards the resistance to steel, both the corrosion ratio and permeation ratio of the ρ-alumina-containing castable refractory are much lower than those of castable refractories containing JIS first class alumina cement or CA-25 and therefore, the former refractory is excellent over the latter refractories.

EXAMPLE 7

In this Example, the effects of binding assistants were examined.

As the binding assistant, glass powder or fumed silica was used. Samples 1 to 3 and comparative sample 1 were prepared from fired bauxite, fired alumina powder, white carbon powder, kibushi-clay powder, a soda lime type frit (average particle size=70μ, softening temperature=600° C.), a high silica frit (average particle size=50μ, softening temperature=970° C.), a dispersant (1) of the β-naphthalene-sulfonic acid/fermalin condensate type, a dispersant (2) of the isobutylene/maleic anhydride copolymer type, KHP-2 (ρ-alumina manufactured and sold by Sumitomo Aluminum Seiren Kabushiki Kaisha), fumed silica and an electrolyte (sodium chloride) as indicated in Table 16. Physical properties of those samples were examined and compared to obtain results shown in Table 16.

TABLE 16

|  | Sample 1 | Sample 2 | Sample 3 | Comparative Sample |
| --- | --- | --- | --- | --- |
| Composition (%) |  |  |  |  |
| fired bauxite | 80 | 80 | 80 | 77 |
| kyanite | 10 | 10 | 10 | 10 |
| fired alumina | 3 | 3 | 3 | 3 |
| white carbon | 0.5 | — | — | — |
| fumed silica | — | — | — | 3 |
| kibushi-clay | — | — | 1 | — |
| KHP-2 | 7 | 7 | 7 | 7 |
| dispersant (1) | 0.3 | 0.3 | — | 0.05 |
| dispersant (2) | — | — | 0.1 | — |
| frit (600° C.) | 1 | 2 | 1 | — |
| frit (970° C.) | — | — | 2 | — |
| electrolyte | — | 0.3 | 0.1 | — |
| Maximum particle size (mm) | 6 | 6 | 6 | 6 |
| Particle Size Distribution (%) |  |  |  |  |
| above 1 mm | 48–53 | 48–53 | 48–53 | 48–53 |
| 1 mm - 0.074 mm | 19–24 | 19–24 | 19–24 | 17–22 |
| below 0.074 mm | 23–28 | 23–28 | 23–28 | 25–30 |
| Amount of Water Added (%) | 13.0 | 12.4 | 12.4 | 11.5 |
| Working time (minutes) | 30 | 35 | 35 | 40 |
| Separation | hardly observed | not observed | not observed | not observed |
| Permanent Linear Change (%) |  |  |  |  |
| 105°C. × 24 hrs. | −0.08 | −0.06 | −0.05 | −0.05 |
| 1100° C. × 3 hrs. | −0.17 | −0.20 | −0.14 | −0.20 |
| 1500° C. × 3 hrs. | −0.13 | −0.09 | −0.11 | −0.12 |
| Bulk Specific Gravity |  |  |  |  |
| 105° C. × 24 hrs. | 2.46 | 2.50 | 2.51 | 2.50 |
| 1100° C. × 3 hrs. | 2.44 | 2.49 | 2.49 | 2.48 |
| 1500° C. × 3 hrs. | 2.45 | 2.49 | 2.50 | 2.49 |
| Modulus of Rupture (Kg/cm$^2$) |  |  |  |  |
| 105° C. × 24 hrs. | 26.3 | 35.1 | 30.8 | 37.2 |
| 1100° C. × 3 hrs. | 36.8 | 44.4 | 48.7 | 45.8 |
| 1500° C. × 3 hrs. | 63.3 | 72.5 | 88.3 | 73.2 |
| Crushing Strength (Kg/cm$^2$) |  |  |  |  |
| 105° C. × 24 hrs. | 137 | 185 | 156 | 205 |
| 1100° C. × C. × 3 hrs. | 181 | 225 | 236 | 254 |
| 1500° C. × 3 hrs. | 293 | 363 | 386 | 367 |

TABLE 16-continued

| | Sample 1 | Sample 2 | Sample 3 | Comparative Sample |
|---|---|---|---|---|
| Hot Modulus of Rupture (Kg/cm$^2$) at 1400° C. | 19.6 | 23.2 | 24.9 | 21.6 |

From the results shown in Table 16, it will readily be understood that the frit as the binding assistant has effects of improving the sintering at about 1100° C. and increasing the hot strength at 1400° C. and the defect of reducing the heat resistance by the frit is not so high, and that the frit as the binding assistant is comparable to fumed silica.

In this Example, sodium chloride was incorporated so as to improve the flowability and enhance the workability.

What is claimed is:

1. A refractory composition consisting essentially of
   (1) no more than 99.7% by weight of a refractory aggregate,
   (2) not less than 0.3% by weight of ρ-alumina as a binder,
   (3) 0.2–8% by weight of glass powder, and
   (4) an effective amount of 2% by weight of dispersant, the amount of said dispersant being based on the total amount of said aggregate having a particle size no greater than 74 micrometers.

2. A refractory composition consisting essentially of
   (1) no more than 99.7% by weight of a refractory aggregate,
   (2) not less than 0.3% by weight of ρ-alumina as a binder, and
   (3) 0.5–20% by weight of fumed silica, 0.2–8% by weight of glass powder.

* * * * *